Sept. 28, 1965       J. L. ROOF       3,209,235

ELECTRICAL CONTROL APPARATUS

Filed July 2, 1962       2 Sheets-Sheet 1

WITNESSES
Leon J. Taja
Donald R. Lackey

INVENTOR
James L. Roof
BY J. E. Browder
ATTORNEY ated Sept. 28, 1965

3,209,235
ELECTRICAL CONTROL APPARATUS
James L. Roof, Lima, Ohio, assignor to Westinghouse Electric Corporation, East Pittsburgh, Pa., a corporation of Pennsylvania
Filed July 2, 1962, Ser. No. 206,905
13 Claims. (Cl. 322—28)

This invention relates in general to electrical control apparatus and more particularly to regulator systems.

The excitation current applied to the field winding of a dynamoelectric machine, such as an alternator, is usually controlled by a voltage regulator system so that a relatively constant voltage output may be obtained under all normal conditions of load and environment. This control of the excitation current may be accomplished by a vairable impedance device in series with the field winding, with the impedance of the device changing according to an error voltage which is proportional to the voltage output. Also, this control of the excitation current may be accomplished by a device in series with the field winding which acts as a relay, and thereby establishes an average excitation current by controlling the periods of conduction and non-conduction according to an error signal triggered by the output voltage.

Voltage regulators using solid state semiconductors fall into these two broad types or categories. The variable impedance type may use an output transistor as the variable impedance element, in series with the field winding of the dynamoelectric machine. A very smooth output voltage is obtained by this system, but it has the disadvantage of high power dissipation in the regulator. The relay type may use an output transistor as a switch in series with the field winding of the dynamoelectric machine. The output transistor is driven to saturation, and thus acts like the closing of a switch, when the voltage output is below a predetermined value, and the transistor is cutoff when the voltage output is above the predetermined value. This type is characterized by low power dissipation in the regulator, but this system has wide instantaneous voltage variations as the transistor switches from one state to the other.

It is, therefore, desirable to provide an improved electrical control apparatus characterized by low power dissipation in the regulator and smooth voltage output.

It is a general object of this invention to provide a new and improved electrical control apparatus.

Another object of this invention is to provide a new and improved regulator system for a dynamoelectric machine, such as an alternator.

Another object of this invention is to provide an improved regulator system comprising solid state semiconductor devices.

It is a more particular object of the invention to provide a new and improved electrical control apparatus for a dynamoelectric machine, such as an alternator, that is characterized by low power dissipation and a smooth voltage output.

It is also an object of this invention to reduce the time required to discharge the field excitation current in the exciter field circuit and improve the load-off transient response.

Briefly, the present invention accomplishes the above objects by using a solid state semiconductor device, such as a transistor, in a series circuit relation with the field winding of a dynamoelectric machine, or more specifically, a brushless generator or alternator. The inherent ripple component of the voltage output of a brushless direct current generator is used to trigger an output or switching transistor, at the frequency of the ripple component, so that the transistor turns on and off once for each ripple cycle. For a three phase alternator with full wave rectification, the ripple frequency is six times the frequency of the alternator. More specifically, by operating a transistor, which is in series with the field winding of a brushless generator, in switching mode, there is very little power dissipation in the regulator. Then, by switching the transistor at rates in the magnitude of, for example, fifteen hundred to five thousand times per second, as determined by the ripple frequency of the output voltage, an average excitation current is developed that will produce a smooth output voltage with instantaneous voltage variations eliminated. The only variation in the output voltage being the inherent ripple of the brushless direct current generator or alternator. The reduction in the time required to discharge the field excitation current and improvement in transient response is accomplished by using a Zener diode to develop a constant field forcing voltage.

Other objects and advantages of the invention will become apparent as the following description proceeds and features of novelty which characterize the invention will be pointed out in particularity in the claims annexed to and forming a part of this specification.

For a fuller understanding of the nature and objects of this invention, reference should be had to the following detailed description taken in connection with the accompanying drawings, in which.

Figure 1:
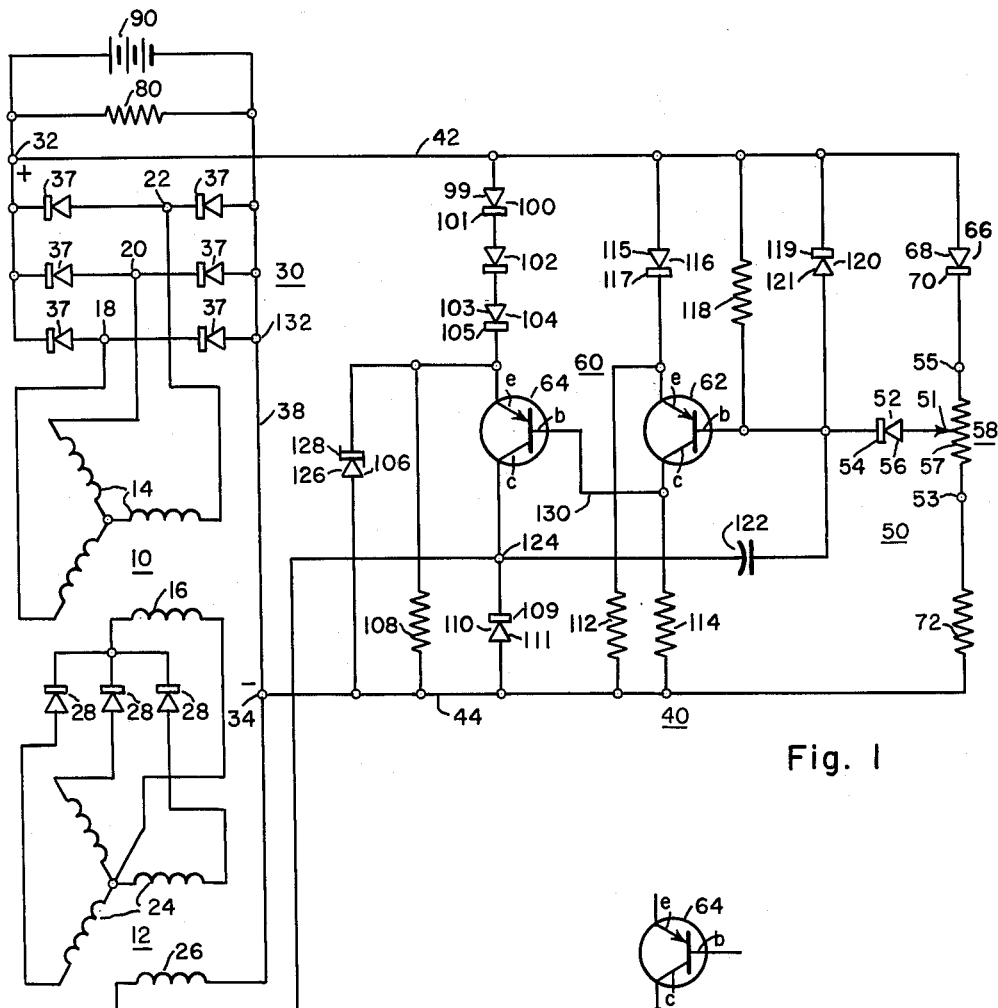
FIGURE 1 is a schematic diagram of apparatus and circuits illustrating the application of this invention to a regulator system.

Referring now to the drawings, and FIG. 1 in particular, there is illustrated a dynamoelectric machine, or more specifically, a two stage brushless generator, having a main generator 10 and an exciter 12. The main generator 10 is comprised of a stationary armature 14 and a rotating excitation field winding 16, with the armature 14 connected to output terminals 18, 20 and 22. The excitation winding 16 of the main generator 10 has its excitation current supplied by the exciter 12. The exciter 12 is comprised of a rotating armature 24, on the same shaft as the rotating field winding 16, a stationary excitation field winding 26, and rotating rectifiers 28. The alternating current output of the exciter 12 is rectified by the rectifiers 28, which are mounted on the shaft of the brushless generator, and the rectified output is connected to the field excitation winding 16 of the main generator 10.

In order to maintain the output of the main generator 10 at substantially a predetermined value, a regulator system 40 is connected between the output of the rectifiers 30, at terminals 32 and 34, and the excitation field winding 26 of the exciter 12.

It will be obvious that the usefulness of the invention is not necessarily restricted to a dynamoelectric machine of the exact type just described. The invention is equally applicable to any brushless direct current generator or any alternator. In the case of an alternator supplying an alternating current to a load, the regulator system would be connected to the alternator output terminals 18, 20 and 22, and the rectifying system 30 would then become a part of the regulator system 40.

In general, the regulating system 40 comprises a first circuit or sensing circuit 50 for producing a direct current error voltage, which is a measure of the deviation of the output terminal voltage of the brushless generator 10 from a reference voltage, and a second circuit or switching circuit 60. The switching circuit 60 is comprised of two solid state semiconductors, or more specifically, two PNP junction type transistors 62 and 64, arranged to operate in switching mode. The first transistor 62 is responsive to the direct current error signal, and drives or controls the switching of the second transistor 64 which is an output or switching device arranged in a series circuit relation with the excitation field winding 26 of the exciter 12. Broadly, the regulator system 40 operates to provide excitation current to the field winding 16 of the main generator 10 through the exciter 12, in the form of periodic pulses supplied to the excitation field winding 26 of the exciter 12. The width of the periodic pulses is varied in accordance with the output voltage of the generator 10 and thus an average excitation current is established which maintains the output voltage of the generator 10 at substantially a predetermined regulated value.

The width of the periodic field voltage pulses is determined by the portion of time during which the switching transistor 64 is conducting. The portion of time during which transistor 64 is conducting compared with the portion of time during which transistor 64 is nonconducting or cutoff determines the average value of the excitation current applied to the excitation field winding 26 of the exciter 12. The average value of the current applied to the excitation field winding 26 of the exciter 12 determines the output voltage across the armature 24 of the exciter 12. The output voltage across the armature 24 of the exciter 12 determines the excitation current applied to the excitation field winding 16 of the generator 10. The output terminal voltage of the generator 10 is controlled, in turn, by the excitation current applied to the excitation field winding 16 of the generator 10.

Energy for the regulator system 40 and the excitation current for the exciter field winding 26 is obtained from the line conductors 36 and 38 at terminals 32 and 34 respectively. Conductors 36 and 38 receive the direct current energy from the three phase full wave rectifying system 30, which system may be comprised of semiconductor diodes 37. Rectifying system 30 in turn receives its energy from the main generator 10, at generator 10 output terminals 18, 20 and 22.

The direct current output terminals 32 and 34, are connected to the sensing circuit 50 by lines 42 and 44. The sensing circuit 50 comprises a voltage sensitive device, which may be a semiconductor diode 52, an adjustable resistance or rheostat 58, a temperature compensating device, which may be a semiconductor diode 66 having a forward voltage drop that varies with temperature, and resistor 72 for protecting semiconductor 52. More specifically, the semiconductor diode 52 is preferably of the type known to the art as a Zener diode. The Zener diode is a silicon junction device which will conduct in a forward direction and, when a certain predetermined voltage has been applied across the diode, it will also conduct in the reverse direction. The voltage at which this nondestructive breakdown occurs is the avalanche or Zener voltage. Once conduction has been initiated, the reverse voltage drop across the diode remains substantially constant for a wide range of reverse current. This characteristic enables the device to be used as a constant voltage reference. The Zener diode 52 is comprised of a cathode 54 and an anode 56. The cathode 54 of Zener diode 52 is connected to the switching circuit 60 and the anode is connected to the movable arm 51 of the rheostat 58. The rheostat 58, resistor 72 and semiconductor diode 66 are connected in a series circuit relation across the direct current output terminals 32 and 34 of the brushless generator 10. More specifically, the positive direct current line 36 is connected to line 42 at output terminal 32. Line 42 is connected to the semiconductor diode 66 which is comprised of an anode 68 and a cathode 70. The anode 68 of semiconductor diode 66 is connected to line 42 and the cathode 70 is connected to terminal 55 of rheostat 58. Terminal 53 of rheostat 58 is connected to one side of resistor 72 and the other side of resistor 72 is connected through line 44, to negative direct current bus 38 at terminal 34.

In the operation of the sensing circuit 50, the direct current output voltage of the rectifier system 30 is a measure of the output terminal voltage of the brushless generator 10. The rheostat 58 is provided in order to vary the proportion of the output voltage of the rectifier system 30 that is applied to the Zener diode 52. As will be explained hereinafter, the rheostat 58 is actually the means for adjusting the regulated value of the output voltage at which the regulator system 40 maintains the output terminal voltage of the brushless generator 10. The Zener diode 52 is selected to have a suitable reverse breakdown voltage and the inherent ripple contained in the direct current voltage output of the rectifier system alternately goes above and below the Zener breakdown voltage so that the Zener diode is alternately conducting and not conducting, at a rate equal to the ripple frequency. This action will be explained in greater detail hereinafter.

Figure 2:
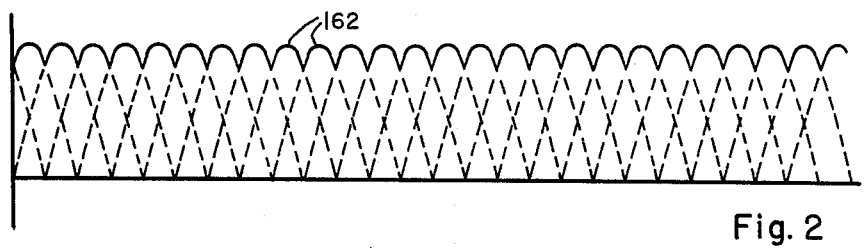
FIG. 2 illustrates the ripple component impressed upon the voltage output of a typical brushless direct current generator or alternator.

FIG. 2 shows the ripple component impressed upon the direct current output of a typical brushless direct current generator.

Semiconductor diode 66 is provided to thermally stabilize the sensing circuit 50. The forward voltage drop across semiconductor diode 66 varies with temperature and can, therefore, be selected to compensate for variations in the breakdown voltage of the Zener diode 52 due to temperature variations. The resistor 72 is provided to protect the Zener diode 52 against excessive current in the event the Zener diode 52 is connected directly to the negative terminal 53 of potentiometer 58.

The switching circuit 60, which in general may be comprised of two PNP junction transistors 62 and 64 is arranged so that it is responsive to the periodic voltage pulses produced by the Zener diode 52 as it alternately breaks down and regains control in the reverse direction. PNP junction transistor 64, comprising an emitter electrode $e$, a collector electrode $c$, and a base electrode $b$, is connected in a series circuit relation with the excitation field winding 26 of the exciter 10. Transistor 64 is operated in switching mode, so that it is either nonconducting (cutoff) or conducting (saturated). At no time does transistor 64 operate in the inefficient range between cutoff and saturation. The switching of transistor 64 is controlled by PNP junction transistor 62. Transistor 62 comprises an emitter electrode $e$, a collector electrode $c$, and a base electrode $b$. In general, transistor 64 is responsive to the output of the sensing circuit 50 and accordingly controls the average current allowed to flow through transistor 64 and the excitation field winding 26 of the exciter 12 by delivering voltage pulses of the appropriate width to establish the average current required to regulate the voltage delivered to the load 80 by the brushless generator 10. In order that the switching circuit 60 function properly, the magnitude of the periodic pulses applied to the switching circuit is such as to always cause complete saturation of the PNP junction type transistor 62.

The smooth voltage output obtained by this invention is obtained because of the very fast switching rate, as high as 5000 times per second, as determined by the frequency of the generator ripple component. It is, therefore, necessary that the switching circuit 60 be capable of switching at the required rates. In particular, the transistor 64 must have a very short turn on and turn off time. To shorten the turn on-turn off time of transistor 64, positive feedback is provided by connecting a capacitor 122 of suitable value between the collector electrode c of transistor 64 and the base electrode b of transistor 62. Also, a rectifier which may be a semi-conductor diode 120 comprising an anode 121 and a cathode 119, is connected between the base electrode b of transistor 62 and the positive side of the output voltage of the brushless direct current generator 10, through line 42. Semiconductor diode 120 limits the feedback pulse provided by capacitor 122 to a safe value. Specifically, semiconductor diode 120 has its cathode 119 collected to the positive direct current output voltage through line 42 and its anode 121 is connected to the base electrode b of transistor 62. Increased reverse bias is provided for transistor 64 by a plurality of semi-conductor diodes 100, 102 and 104. This increased reverse bias enables transistor 64 to turn off in a very short time. Semiconductor diodes 100, 102 and 104 are connected between the positive side of the direct current output of the brushless D.C. generator 10 through line 42 and the emitter electrode e of transistor 64. The semiconductor diodes 100, 102 and 104 are connected in series, cathode to anode, with the anode 99 of semiconductor diode 100 connected to the positive direct current output voltage through line 42 and the cathode 105 of semiconductor diode 104 is connected to emitter electrode e of transistor 64. Completing the reverse bias circuit for transistor 64 is a resistor 108, connected between the emitter of transistor 64 and the negative side of the direct current output through line 44. Also connected between the emitter electrode e of transistor 64 and the negative side of the direct current output voltage through line 44 is a rectifier, which may be a semiconductor diode 106, comprising an anode 126 and a cathode 128. Semiconductor diode 106 is preferably a Zener diode and its function is to clip high voltage spikes induced by the load 80, and, when operating without a battery 90, it clamps the load removal transient to a safe value. Specifically, Zener diode 106 has its anode 126 connected to line 44 and the negative side of the direct current output voltage, and its cathode 128 is connected to the emitter electrode e of transistor 64.

The reverse bias circuit for transistor 62 is formed by a rectifier, which may be a semiconductor diode 116 comprised of an anode 115 and a cathode 117, resistor 118, and resistor 112. By biasing the base electrode b positive with respect to the emitter electrode c of transistor 62, leakage current is prevented when no periodic output pulses are present from Zener diode 52, and this also allows operation of the circuit up to approximately +75° centigrade. Specifically, semiconductor diode 116 has its anode 115 connected to line 42 and the positive direct current output voltage, and its cathode 117 is connected to the emitter electrode e of transistor 62. Resistor 118 has one side connected to line 42 and the other side to the base electrode b of transistor 62. The resistor 112, which also provides a small amount of bleed current for semiconductor diode 62, is connected between the emitter electrode e of transistor 62 and the negative direct current output voltage line 44. Transistor 62 is connected to transistor 64 through a line 130 extending from the base electrode b of transistor 64 to the collector electrode c of transistor 62. Resistor 114 is connected to the line 130 between the two transistors 62 and 64, and the negative side of the direct current voltage line 44. Resistor 114 serves as a collector load resistor for transistor 62 and as a base drive reistor for transistor 64. The excitation field winding 26 of the exciter 12 is connected in a series circuit relation with the transistor 64 emitter-collector path and the reverse bias producing semiconductor diodes 100, 102 and 104. Specifically, one side of the excitation field winding 26 of the exciter 12 is connected to the negative side of the direct current output voltage of the brushless generator 10 at point 132. The other side of the field winding 26 is connected to the collector electrode c of transistor 64 at point 124. The emitter electrode e of transistor 64 is connected to the semiconductor diodes 100, 102 and 104, as explained previously, and they are in turn connected to the positive side of the direct current output voltage line 42.

Completing the basic circuit is a rectifier, which may be a semiconductor diode 110, comprised of an anode 111 and a cathode 109. The cathode 109 of semiconductor diode 110 is connected to collector electrode c of transistor 64 at point 124, and its anode 111 is connected to the negative side of the direct current voltage line 44. The semiconductor diode 110 is provided as a low resistance discharge path for the voltage produced by the collapsing field of the excitation field winding 26 during periods of which the transistor 64 is nonconducting. The diode 110 prevents any excessive voltage across the transistors 62 and 64 due to the voltage produced by the collapsing field of the excitation field winding. Semiconductor diode 110 conducts field current every time transistor 64 is cut off.

Figure 6:
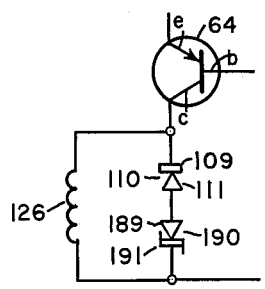
FIG. 6 is a schematic diagram illustrating how the portion of the invention related to field forcing could be applied to the regulator system shown in FIG. 1.

FIG. 6 shows a novel field forcing arrangement which may be added to the circuit of FIG. 1 to reduce the time required to discharge the field excitation current and flux in the exciter field circuit and also improve the load off transient response.

This field forcing circuit involves connecting a semiconductor diode 190, having an anode 191 and a cathode 189, in a series circuit relationship with semiconductor diode 110. Semiconductor diode 190 is preferably of the type known in the art as a Zener diode. The addition of this Zener diode 190 to the circuit produces a very marked reduction in the time required to discharge the field excitation current and flux in the exciter field circuit and improves the load off transient response.

Specifically, the cathode 109 of semiconductor diode 110 is connected to collector electrode c of PNP transistor 64 at point 124 and its anode 111 is connected to the anode 189 of Zener diode 190. The cathode 191 of Zener diode 190 is connected to the negative side of the direct current voltage line 44. If transistor 64 were of the NPN type, the semiconductor diodes 110 and the Zener diode 190 would trade places in the circuit. In other words, the cathode 191 of Zener diode 190 would be connected to the collector electrode c of the NPN transistor and its anode 189 would be connected to the anode 111 of semiconductor diode 110. The cathode 109 of semiconductor diode 110 would be connected to the negative side of direct current voltage line 44.

When the transistor 64 allows field current to flow in excitation field winding 26, the current build up is gradual because of the counterelectromotive force (E.M.F.) generated by the self-inductance of the excitation field winding 26. When field current starts to flow, the magnetic lines of force produced intersect the turns of wire in the field winding 26 and builds up a counter E.M.F. that opposes the source E.M.F. This opposing E.M.F. causes a delay in the time it takes for the field excitation current to build up to a steady value. When the source E.M.F. is discontinued by transistor 64 being driven to cut-off, the magnetic lines of force collapse, again intersecting the turns on the field excitation winding and building up an E.M.F. that tends to prolong the flow of the field excitation current. The time to reach a steady state condition after interruption of the field circuit, or after the field has been established, must be reduced to allow fast switching of the switching device connected in a series circuit relationship with the field excitation winding.

As mentioned previously, semiconductor diode 110 provides a low voltage drop discharge path and protects the output or switching transistor from high voltage spikes. However, this semiconductor diode 110 does not allow a rapid discharge of field excitation current. In tests conducted on a regulator just using a semiconductor diode across the field, typical times required for the voltage to return to normal were one hundred and seventy-two milliseconds initial recovery time for buildup and ninety-six milliseconds for full load removal at seventy-five percent power factor. A common method of field forcing is to connect a resistor in series with the diode 110 and thereby decrease the time constant (L/R) of the field excitation circuit. However, the inductive current produces a voltage drop across the resistor that adds to the power supply voltage and increases the voltage presented to the switching transistor. Another disadvantage of using a resistor in this manner is that the field forcing voltage is not constant since it is the product of the current times the resistance (IR) and the current is decreasing. Typical initial recovery times using a five ohm resistor, which is a practical limiting value of resistance to keep the initial IR voltage from becoming too high, are one hundred and forty milliseconds for buildup and seventy-six milliseconds for full load removal at seventy-five percent power factor.

The solution to the field forcing problem is the use of a Zener diode 190 in the discharge circuit instead of a resistor. As explained previously, once the reverse voltage across a Zener diode reaches a certain value, the Zener diode breaks down non-destructively and conducts a wide range of reverse current with substantially a constant voltage drop. This constant voltage drop across the Zener diode is used as the field forcing voltage. This field forcing voltage remains essentially constant with a reverse current that varies from a few milliamps to several amperes.

In the tests conducted, typical initial recovery time for buildup was one hundred and thirty-two milliseconds and for full load removal at seventy-five percent power factor it was sixty-four milliseconds, using a six and eight-tenths volt Zener diode. With a ten volt Zener diode, the times became one hundred and twenty milliseconds and fifty-two milliseconds respectively. A ten volt Zener only adds ten volts to the supply voltage under any field current conditions, whereas a five ohm resistor could add up to twenty-five volts for a five ampere excitation condition.

This field forcing arrangement is applicable to any dynamoelectric machine using a switching device in the field excitation circuit to regulate the output voltage of the dynamoelectric machine.

Referring again to FIG. 1, when a voltage pulse is produced by the Zener diode 52, it is applied to the base electrode b of transistor 62. This action renders the base electrode b negative with respect to the emitter electrode e of transistor 62 and overcomes the reverse bias applied to transistor 62. Base current is, therefore, allowed to flow and saturation current flows from the emitter electrode e to the collector electrode c. This action raises the collector electrode c voltage of transistor 62 and also raises the base electrode b voltage of transistor 64, as these two electrodes are interconnected by line 130. The voltage increase of the base electrode b of transistor 64 cuts off transistor 64 so that no voltage is applied to the excitation field winding 26 of the exciter 12. When no pulse is produced by the Zener diode 52, transistor 62 is not conducting. However, transistor 64 is at saturation because base current of transistor 64 is flowing through resistor 114. Therefore, during periods of no pulse signal from the Zener diode 52, the transistor 64 is allowing field current to flow through excitation field winding 26 of the exciter 12, allowing the main generator 10 to have an excitation current flowing through its field winding 16 and armature 14 is consequently generating an output voltage.

In summary, Zener diode 52, in conjunction with rheostat 58, resistor 72 and semiconductor diode 66, will produce a voltage pulse when the direct current voltage output of the brushless generator system 10 exceeds a certain predetermined voltage. The width of this pulse will vary in accordance with the deviation of the direct current output voltage from the reference voltage. The reference voltage is determined by the Zener or breakdown voltage of the Zener diode 52 as modified by semiconductor diode 66, voltage adjusting rheostat 58 and resistor 72. The width of the pulse will be greater or less depending upon whether the output voltage of the brushless generator 10 is above or below the regulated value of the output voltage of the brushless generator 10. The ripple component inherent in the output of a brushless direct current generator exceeds the Zener voltage during each ripple cycle and triggers the Zener diode 52. Pulses are, therefore, created at a rate equal to the frequency of the ripple in the output voltage. When no pulse signal is being received by transistor 62, transistor 64 is at saturation and, thus, current is flowing through the field excitation winding 26 of the exciter 12. When a pulse is received by transistor 62, transistor 62 is saturated and transistor 64 is cutoff. Therefore, during the period a pulse is being impressed upon transistor 62, there is no current flowing through transistor 64 or through the field winding 26. By varying the width of the pulses, any average excitation current may be obtained and accurate fast control of the direct current output voltage of the brushless generator is acquired.

The operation of the complete regulator system will now be described. Initially, we will assume that the slider arm 51 of rheostat 58 is set at terminal 55 so that there is no part of the rheostat resistance between the positive side of the direct current voltage output line 42 and the Zener diode 52. The direct current voltage output will increase to the Zener or breakdown voltage of the Zener diode 52, as during this build up period transistor 64 is conducting field current without interruption. Therefore, no auxiliary starting means is required during the start up period. When the Zener breakdown voltage is reached, the Zener diode 52 conducts a pulse which turns transistor 62 on and transistor 64 off. Since this prevents field excitation current from flowing in the field winding 26 of exciter 12, the direct current voltage output of the brushless direct current generator starts to drop and when the ripple component of the voltage output drops below the breakdown voltage of the Zener diode 52, the Zener diode 52 no longer conducts and transistor 62 is cutoff with transistor 64 again turning on and allowing field current to flow and the direct current output voltage to build up. This on-off action of the Zener diode is triggered by the rising and falling of the voltage due to the inherent ripple component always present in the output of a brushless direct current generator. Even if a battery 90 is connected across the output of the brushless direct current generator, which causes a filtering action of the ripple, there is still enough ripple present to trigger the Zener diode. This ripple component of the direct current output voltage, and how it is generated through full wave rectification of the alternator output, is graphically shown in FIG. 2.

Because the ripple frequency is between 1500 to 5000 cycles per second, a very smooth voltage output is created without the instantaneous voltage swings which would be created if the switching was occurring at relatively low rates.

As pointed out previously, the voltage output can be adjusted by the rheostat 58. Exactly how this is accomplished will now be explained. Assume we now move the slider of the rheostat 58 to point 57, which adds resistance between the Zener diode 52 and the positive side of the direct current output voltage, or line 42. Instead of the total direct current output voltage being impressed upon the Zener diode, a portion of this output voltage will now be dropped across the portion of the rheostat previously added. Therefore, the direct current output voltage will have to increase in magnitude before the breakdown voltage of the Zener diode 52 is reached, and the regulated output voltage will therefore be greater. The transistor 64 will conduct without interruption until the voltage builds up to a point where the direct current output voltage, less the voltage drop across the rheostat, equals the breakdown or Zener voltage of the Zener diode 52. Then the ripple frequency will again trigger the alternate on-off action of the two transistors 62 and 64. As explained earlier, as the temperature of the Zener diode 52 changes, its breakdown voltage changes. Semiconductor diode 66 is selected to have a forward voltage drop which varies with temperature and can offset the temperature characteristic of the Zener diode by allowing more or less voltage to be applied to the Zener diode 52 as required.

Figure 3:
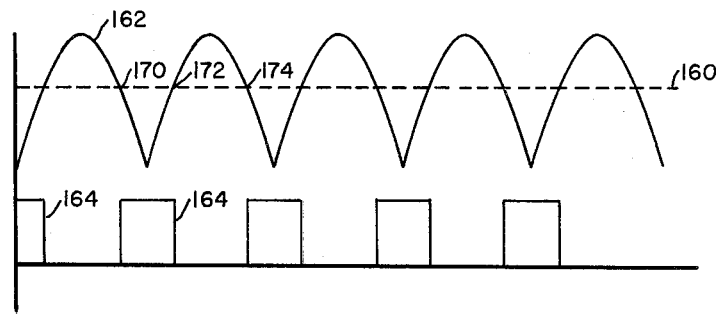
FIGS. 3, 4 and 5 are sets of graphs illustrating the operation of the control apparatus shown in FIG. 1 for various magnitudes of the output voltage of the dynamoelectric machine shown in FIG. 1.
Figure 4:
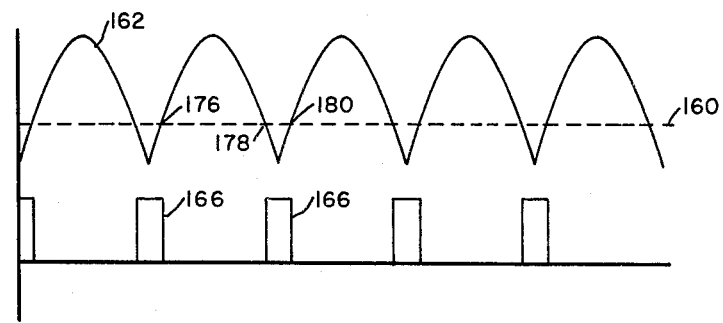
Figure 5:
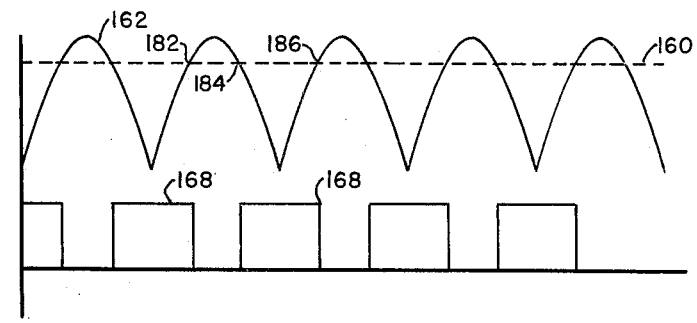

Once a regulated value of voltage is selected by the rheostat 58, we will examine how this voltage is maintained at the predetermined value as the load conditions, or other factors affecting voltage output, are changed. FIGS. 3, 4, and 5 show the ripple component 162 of FIG. 2 enlarged to allow a better understanding of the graphs. FIGS. 3, 4 and 5 illustrate the pulse modulation of the excitation field voltage for the operation of the brushless direct current generator 10 when the output voltage of said generator is at the regulated value, above the regulated value, and below the regulated value, respectively. In particular, the FIGS. 3, 4 and 5 indicate the field voltage pulses that are applied to the field excitation winding 26 of the exciter 10 for each of the above described conditions. Dotted line 160 represents the predetermined voltage as determined by the combination of the Zener diode 52, the temperature compensating semiconductor diode 66, the resistor 72 and the resistance setting on the rheostat 58. When the ripple component 162 falls below the breakdown voltage line 160, as evidenced by point 170 to point 172 in FIG. 3, no pulse is created by Zener diode 52, transistor 62 is cutoff and transistor 64 is saturated. Therefore, field current is allowed to flow during this period, as evidenced by field voltage pulse 164. As the direct current output voltage ripple component builds up and exceeds the predetermined voltage line 160, a pulse is allowed to flow by Zener diode 52, causing transistor 62 to saturate and thus driving transistor 64 to cutoff. During this period while transistor 64 is cutoff, there is no exciter field voltage. Now, assume the load 80 was removed from the brushless direct current generator output or some other condition occurred to cause the voltage to rise. FIG. 4 illustrates this effect upon the field current allowed to flow in the excitation field winding 26 of the exciter 12. The pulses of exciter field voltage 166 are narrowed to produce a lower average field current, because transistor 62 is conducting a greater portion of the time due to the wider pulses produced by the Zener diode 52. In other words, the breakdown voltage of the Zener diode is exceeded from point 176 to point 178, allowing transistor 62 to conduct and turning the exciter field control element or transistor 64 off. This decrease in average field current will cause the voltage output to drop back to the desired regulated value.

If the load 80 is increased, or some other occurrence causes the voltage to decrease, FIG. 5 illustrates the effect upon the field voltage pulse width. The Zener diode is transmitting a pulse to transistor 62 only during the relatively short period its breakdown voltage is exceeded, as evidenced by point 182 to point 184. From points 184 to 186, the Zener voltage not being exceeded, no pulse is sent to transistor 62 and transistor 64 is allowed to conduct. As a result, field voltage occurs in wider pulses as evidenced by the pulses 168 in FIG. 5. The wider pulses establish an increase in the average excitation current and the voltage output rises to the desired regulated value as shown in FIG. 3. Therefore, in order to maintain a predetermined regulated voltage, the pulses of excitation voltage are modulated to produce an average excitation current in the field winding 26 of the exciter 12 that will produce the value of direct current output voltage desired. In summary, when the output voltage exceeds the regulated value, the voltage pulse applied to the excitation field winding 26 of the exciter 10 narrows, causing the average field current to drop in value and, therefore, causing the output voltage to decline to the proper value. When the output voltage is below the regulated value, the voltage pulse applied to the excitation field winding 26 of the exciter 10 widens, causing the average field current to increase in value, and, therefore, causing the output voltage to rise to the proper value.

It will, therefore, be apparent that there has been disclosed a regulator system characterized by a smooth voltage output with instantaneous variations eliminated. Also, by operating the switching transistors 62 and 64 in switching mode, there is very little power dissipation in the regulator. In addition, by adjusting the excitation of the brushless generator 10 by a pulse width modulation, the problem of drift from the operating point is substantially eliminated. Further, a regulator system embodying the teachings of this invention has the advantage that the starting up of the alternator or brushless direct current generator may be accomplished automatically without the need for a separate starting control signal, since the regulator system 40 is arranged to produce excitation current without the application of input control signals of a predetermined magnitude from the associated generator. Also, an important advantage of the electrical control appartus as described is that the pulse width modulation is provided without requiring a separate sawtooth generator, relaxation oscillator, or wave shaping means. Finally, a field forcing means was described that improves the load off transient response and reduces the time required to discharge the field excitation current without the disadvantage of adding a high voltage to the source voltage.

Since numerous changes may be made in the above described apparatus and different embodiments of the invention may be made without departing from the spirit thereof, it is intended that all matter contained in the foregoing description or shown in the accompanying drawing shall be interpreted as illustrative, and not in a limiting sense.

I claim as my invention:

1. A regulator system for maintaining at a substantially predetermined value a unidirectional output voltage of a brushless generator having an excitation winding and output terminals, said output voltage having a ripple component, comprising a semiconductor diode having a substantially constant voltage drop in its reverse direction connected in circuit relation with said voltage output said semiconductor diode producing periodic voltage pulses at said ripple component frequency, said periodic voltage pulses varying in width according to the difference between the magnitudes of said predetermined voltage and said output voltage, first semiconductor switching means connected in circuit relation with said semiconductor diode and producing a control signal responsive to said periodic voltage pulses of said semiconductor diode, second semiconductor switching means connected in series circuit relation with said excitation winding, means connected in circuit relation with said first and second semiconductor switching means for providing a positive feedback signal which reduces the switching time of said second semiconductor switching means, means connected in circuit relation with said second semiconductor switching means for providing a reverse bias signal which reduces the switching time of said second semiconductor switching means, and means connected across said excitation winding for reducing the discharge time of said excitation winding, said second semiconductor switching means having a switching rate and ratio of on to off time responsive to said control signal of said first semiconductor switching means.

2. A control system for maintaining at a substantially predetermined value a unidirectional output voltage of a brushless generator having an excitation winding and output terminals, said output voltage having a ripple component, comprising a semiconductor rectifier of the Zener diode type being connected in circuit relation with said voltage output producing periodic voltage pulses at said ripple component frequency, said periodic voltage pulses varying in width according to the difference between the magnitudes of said predetermined voltage and said output voltage, a first switching transistor connected in circuit relation with said Zener diode, the periodic voltage pulses produced by said Zener diode switching said first transistor between saturation and cutoff, a second switching transistor connected in circuit relation with said excitation winding and responsive to the switching of said first transistor, such that when said first transistor is at saturation said second transistor is at cutoff and when said first transistor is at cutoff said second transistor is at saturation, means connected in circuit relation with said first and second switching transistors for providing a positive feedback signal which reduces the switching time of said second switching transistor, means connected in circuit relation with said second switching transistor for providing a reverse bias signal which reduces the switching time of said second switching transistor, and means connected across said excitation winding for reducing the discharge time of said excitation winding.

3. A control system for maintaining at a substantially predetermined value a unidirectional output voltage of a brushless generator having an excitation winding and output terminals, said output voltage having a ripple component, comprising a semiconductor voltage sensing device connected in circuit relation with said unidirectional voltage output, said voltage sensing device producing periodic voltage pulses responsive to said ripple component at said ripple component frequency, said periodic voltage pulses varying in width according to the difference between the magnitudes of said predetermined voltage and said unidirectional output voltage, first solid state switching means connected in circuit relation with said voltage sensing device and producing a control signal responsive to said periodic voltage pulses of said voltage sensing means, and second solid state switching means having main and control electrodes, said main electrodes being connected in series circuit relation with said excitation winding, said control electrode of said second solid state switching means being connected in circuit relation with said control signal produced by said first solid state switching means, means connected in circuit relation with said first and second solid state switching means for providing a positive feedback signal which reduces the switching time of said second solid state switching means, means connected in circuit relation with said second solid state switching means for providing a reverse bias signal which reduces the switching time of said second solid state switching means, and means connected across said excitation winding for reducing the discharge time of said excitation winding.

4. A regulator system for maintaining at a substantially predetermined value an alternating current output voltage of a dynamoelectric machine having an excitation winding and output terminals, comprising rectifier means connected in circuit relation with said alternating current circuit producing a unidirectional output voltage having a ripple component, the magnitude of said unidirectional output voltage varying with said alternating current output voltage, a Zener diode having an anode and cathode, the anode of said Zener diode being connected in circuit relation with said rectifier means producing periodic voltage pulses at said ripple component frequency, said periodic voltage pulses varying in width according to the difference between the magnitudes of said predetermined voltage and said output voltage, first and second transistors each having main electrodes and a control electrode, the control electrode of said first transistor being connected in circuit relation with the cathode of said Zener diode producing a control signal responsive to said periodic voltage pulses of said Zener diode, the main electrodes of said second transistor being connected in series circuit relation with said excitation winding, the main electrodes of said second transistor intermittently allowing current to flow in said excitation winding responsive to said control signal of said first transistor, first means connected in circuit relation with the control electrode of said first transistor and one of the main electrodes of said second transistor for providing a positive feedback signal, second means connected in series circuit relation with the main electrodes of said second transistor for providing a reverse bias signal, and third means connected across said excitation winding for reducing the discharge time of said excitation winding, said first, second and third means enabling said second transistor to switch at the ripple component frequency.

5. In a dynamoelectric machine having an excitation winding, output terminals, and regulating means which interrupts the excitation current, semiconductor means connected across said excitation winding providing a substantially constant field forcing voltage after interruption of the excitation current, said semiconductor means reducing the excitation current discharge time and improving load-off transient response, said semiconductor means including a diode poled to allow current flow from said excitation winding when said regulating means interrupts said excitation current and a Zener diode poled to provide said field forcing voltage.

6. In a dynamoelectric machine having an excitation winding, output terminals, and output voltage regulating means which interrupts the excitation current, an asymmetrically conducting device connected across said excitation winding providing a discharge path for said excitation winding, a Zener diode connected in series circuit relation with said asymmetrically conducting device providing a substantially constant field forcing voltage after interruption of the excitation current, said field forcing voltage reducing the excitation current discharge time and improving load off transient response.

7. In a dynamoelectric machine having an excitation field winding, output terminals, and regulating means which interrupts the excitation current, field forcing means reducing said excitation current discharge time and improving load-off transient response after interruption of said excitation current, said field forcing means comprising a solid state constant voltage drop device and an asymmetrically conducting device connected across said excitation winding.

8. In a dynamoelectric machine having an excitation winding, output terminals, and regulating means which interrupts the excitation winding current, means providing a discharge circuit for said excitation field winding after said interruption, said means reducing said excitation winding current discharge time and improving load-off transient response after interruption of said excitation winding current, said means comprising first and second semiconductor diodes connected across said excitation winding, said first semiconductor diode poled to allow current flow from said excitation winding after said interruption, said second semiconductor diode being of the Zener diode type and poled opposite to said first semiconductor diode.

9. In a dynamoelectric machine having an excitation field winding, output terminals and regulating system which interrupts the field excitation current, first means comprising an asymmetrically conducting device connected across said excitation field winding and poled to provide a low voltage drop discharge path for said field excitation current after said interruption, and a semiconductor constant voltage drop device connected in circuit relation with said first means and excitation field winding providing a field forcing voltage for reducing the field excitation current discharge time after said interruption.

10. In a dynamoelectric machine having an excitation field winding, output terminals and regulating system which interrupts the field excitation current, the combination comprising a first semiconductor device connected across said excitation field winding and poled to provide a low voltage drop discharge path for said field excitation current after interruption of said field excitation current, and a Zener diode connected in series circuit relation with said first semiconductor diode and excitation field widing and poled to provide a substantially constant field forcing voltage for reducing the field excitation discharge time after interruption of said field excitation current.

11. A regulator system for maintaining at a substantially predetermined value a unidirectional output voltage of a dynamoelectric machine having an excitation winding and output terminals, said output voltage having a ripple component, comprising first means connected in circuit relation with said voltage output producing periodic voltage pulses at said ripple component frequency, said periodic voltage pulses varying in width according to the difference between the magnitudes of said predetermined voltage and said output voltage, second means connected in circuit relation with said first means producing a control signal responsive to said periodic voltage pulses of said first means, switching means connected in series circuit relation with said excitation winding, said switch-means having a switching rate and ratio of on to off time responsive to said control signal of said second means, and means reducing said excitation current discharge time after interruption of said excitation current comprising first and second semiconductor diodes connected across said excitation winding, said first semiconductor diode poled to provide a discharge path for current from said excitation winding after each interruption of said excitation current, said second semiconductor diode being of the Zener diode type and poled opposite to said first semiconductor diode to provide a substantially constant field forcing voltage.

12. A regulator system for maintaining at a substantially predetermined value an alternating current output voltage of a dynamoelectric machine having an excitation winding and output terminals, comprising first means connected in circuit relation with said alternating current circuit producing a unidirectional output voltage having a ripple component, the magnitude of said unidirectional output voltage varying with said alternating current output voltage, second means connected in circuit relation with said first means producing periodic voltage pulses at said ripple component frequency, said periodic voltage pulses varying in width according to the difference between the magnitudes of said predetermined voltage and said output voltage, third means being connected in circuit relation with said second means producing a control signal responsive to said periodic voltage pulses of said second means, fourth means connected in series circuit relation with said excitation winding, said fourth means being arranged to intermittently allow current to flow in said excitation winding responsive to the control signal of said third means, and fifth means connected across said excitation field winding providing a low voltage drop discharge path to said field excitation current and reducing the field excitation current discharge time after each field current conducting period, said fifth means comprising a plurality of semiconductor diodes with one or more of said semiconductor diodes having substantially a constant reverse voltage drop.

13. A regulator system for maintaining at a substantially predetermined value a unidirectional output voltage of a dynamoelectric machine having an excitation winding and output terminals, said output voltage having a ripple component, comprising a first semiconductor Zener diode connected in circuit relation with said output voltage producing periodic voltage pulses at said ripple component frequency, said periodic voltage pulses varrying in width according to the difference between the magnitudes of said predetermined voltage and said output voltage, a semiconductor transistor connected in circuit relation with said Zener diode producing a control signal responsive to said periodic voltage pulses of said Zener diode, a second semiconductor transistor connected in series circuit relation with said excitation winding, said second transistor intermittently conducting at a rate and ratio of on to off times responsive to the control signal produced by said first transistor, and means including an asymmetrically conducting device and a second Zener diode connected across said excitation winding to provide a discharge path for current from said excitation winding when said second transistor is not conducting, said second Zener diode providing a substantially constant voltage drop reducing the field current discharge time of said excitation winding.

References Cited by the Examiner
UNITED STATES PATENTS 2,897,428 7/59 Wilkins _____ 322—79
2,996,653 8/61 Roff.
3,044,066 7/62 Barnard.

LLOYD McCOLLUM, *Primary Examiner.*